Patented Oct. 18, 1932

1,882,808

UNITED STATES PATENT OFFICE

GEORGE D. GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

ESTER INTERCHANGE WITH ORGANIC ACIDS

No Drawing. Application filed October 12, 1928. Serial No. 312,218.

This invention relates to the art of making organic compounds, and more particularly esters and organic acids.

I have found that by mixing in the presence of a suitable catalyst a desirable interchange may be caused to take place between esters and organic acids, whereby the acid combines with the alcohol radical from the ester, setting free the acid from the ester and forming the corresponding ester of the acid added.

It is therefore an object of this invention to provide a new method of making esters and organic acids.

It is another object of this invention to provide a method of effecting an interchange between esters and organic acids.

It is also an object of this invention to shift the reaction in the desired direction by distilling the more volatile reaction product.

With the above and other objects in view, which will be apparent as the description proceeds, I have set forth my invention in the following specification and have included several examples by way of illustration and not as a limitation.

Example 1

A mixture of 3.2 mols of ethyl acetate, 4.4 mols of formic acid (in the commercial 85% solution) and 0.1 mol of concentrated sulfuric acid was distilled through an effective fractionating column, the fractionation being so controlled that a minimum of ethyl acetate comes off with the ethyl formate. There were removed 2.5 mols of ethyl formate and 0.7 mols of ethyl acetate. The residue consisted of 2.5 mols of acetic acid and 1.9 mols of formic acid. The yield was 78%.

Example 2

In a similar manner, a mixture of 2.0 mols of ethyl propionate, 2.2 mols of acetic acid and 0.1 mol of concentrated sulfuric acid was distilled. There were removed 1.25 mols of ethyl acetate and 0.75 mols of ethyl propionate. The residue consisted of 1.25 mols of propionic acid and 0.95 mols of acetic acid. The yield was 62.5%.

Example 3

In a similar manner, a mixture of 2.0 mols of ethyl lactate, 2.2 mols of acetic acid and 0.1 mol of concentrated sulfuric acid was distilled. There were removed 1.7 mols of ethyl acetate and 0.5 mols of acetic acid. The residue consisted of 0.2 mols of ethyl lactate and 1.8 mols of a mixture of lactic acid and lactic anhydride. The yield was 85–90%.

Example 4

In a similar manner, a mixture of 0.5 mols of diethyl carbonate, 1.0 mol of acetic acid and 0.1 mol of concentrated sulfuric acid was distilled and carbon dioxide was evolved. The distillate of ethyl acetate was collected and mounted at 0.9 mol, or a yield of 90%.

Although the above examples are limited to reactions between ethyl acetate and formic acid, ethyl propionate and acetic acid, ethyl lactate and acetic acid and diethyl carbonate and acetic acid, my invention is of general application for the interchange between esters and organic acids, including polybasic acids as well as monobasic acids, and includes reactions at room temperature as well as those in which heat is applied.

I have found that if the reactants and the end products have substantially different boiling points the reaction can be shifted in the desired direction by removing one of the reaction products by distillation.

Although the above examples are described as batch processes, they can be made continuous by adding the mixed reactants through the column, drawing off the resulting ester from the top of the column, and drawing off the acid produced at the bottom of the still.

As many apparently widely different embodiments of this invention may be made without departing from the spirit and scope thereof, it is to be understood that I do not limit myself to the specific embodiments thereof except as defined in the appended patent claims.

I claim:

1. The method of shifting the reaction between an aliphatic monocarboxylic acid ester and an aliphatic monocarboxylic acid in the direction of the opposite ester and the opposite acid when one of the newly formed products has a lower boiling point than either of the original reactants, which comprises distilling off one of the reaction products in the presence of a catalyst.

2. The process of manufacturing an ester comprising allowing an aliphatic monocarboxylic acid to react with an ester of an aliphatic monocarboxylic acid to form an ester possessing a lower boiling point than the acid added, and distilling off the new ester as it is formed in order to upset the equilibrium and carry the reaction to completion.

3. The process of manufacturing an alkyl ester comprising allowing an aliphatic monocarboxylic acid to react with an alkyl ester of a fatty acid to form an ester possessing a lower boiling point than the original ester, and distilling off the ester as it is formed in order to upset the equilibrium and carry the reaction to completion.

4. The method of effecting an ester interchange with organic acids which comprises mixing ethyl acetate and formic acid in the presence of a catalyst to form acetic acid and ethyl formate.

5. The method of effecting an ester interchange with organic acids which comprises distilling an aliphatic monocarboxylic acid with an aliphatic monocarboxylic acid ester in the presence of sulfuric acid to form another ester and another acid at least one of which newly formed products has a lower boiling point than either of the original reactants.

6. The method of claim 5 in which ethyl acetate and formic acid react to form acetic acid and ethyl formate.

7. The method of effecting an ester interchange between an organic acid and an organic ester which comprises reacting an aliphatic monocarboxylic acid with an ester of an aliphatic monocarboxylic acid in the presence of a catalyst.

8. The method of effecting an ester interchange between an aliphatic monocarboxylic acid and an aliphatic monocarboxylic acid ester which comprises reacting the acid with the ester in the presence of sulfuric acid.

9. The method of effecting an ester interchange between an aliphatic monocarboxylic acid and an aliphatic monocarboxylic acid ester which comprises heating the acid with the ester in the presence of a catalyst.

10. The process set forth in claim 9 in which the reaction takes place in the presence of sulfuric acid.

In testimony whereof, I affix my signature.

GEORGE D. GRAVES.